United States Patent [19]
Grinbergs et al.

[11] Patent Number: 5,632,334
[45] Date of Patent: May 27, 1997

[54] HEAT RECOVERY VENTILATOR WITH ROOM AIR DEFROSTING FEATURE

[75] Inventors: Peter K. Grinbergs, Dorchester; Grant W. Miles, London, both of Canada

[73] Assignee: Nutech Energy Systems Inc., Ontario, Canada

[21] Appl. No.: 460,197

[22] Filed: Jun. 2, 1995

[30] Foreign Application Priority Data

Jan. 13, 1995 [CA] Canada ................ 2140232

[51] Int. Cl.$^6$ ............... F24H 3/02; F24H 3/10; F24F 7/08
[52] U.S. Cl. ............... 165/232; 165/233; 165/54
[58] Field of Search ............... 165/232, 233, 165/54, 909

[56] References Cited

U.S. PATENT DOCUMENTS

| | | | |
|---|---|---|---|
| D. 142,342 | 8/1945 | De Flon et al. | D13/1 |
| D. 184,288 | 1/1959 | Mart | D62/4 |
| D. 187,623 | 4/1960 | Hamilton | D62/4 |
| D. 195,487 | 6/1963 | Goldsmith | D62/4 |
| D. 198,147 | 5/1964 | Phelps et al. | D62/4 |
| 215,572 | 5/1879 | Chase . | |
| D. 275,226 | 8/1984 | Nishigaki | D24/17 |
| D. 286,565 | 11/1986 | Drucker et al. | D23/155 |
| 2,596,008 | 5/1952 | Collins | 257/245 |
| 2,617,634 | 11/1952 | Jendrassik | 257/245 |
| 2,917,292 | 12/1959 | Hittrich | 261/7 |
| 3,313,343 | 4/1967 | Ware et al. | 165/166 |
| 3,360,038 | 12/1967 | Stampes | 165/166 |
| 3,444,926 | 5/1969 | Stalberg | 165/166 |
| 4,099,928 | 7/1978 | Norback | 29/157.3 D |
| 4,258,784 | 3/1981 | Perry et al. | 165/166 |
| 4,377,201 | 3/1983 | Kruse et al. | 165/76 |
| 4,377,400 | 3/1983 | Okamoto et al. | 55/269 |
| 4,389,857 | 6/1983 | Svendsen | 62/325 |
| 4,462,459 | 7/1984 | Schmidlin | 165/54 |
| 4,653,581 | 3/1987 | Yogo et al. | 165/166 |
| 4,815,534 | 3/1989 | Fuerschbach | 165/167 |
| 4,987,955 | 1/1991 | Bergqvist et al. | 165/167 |
| 5,002,118 | 3/1991 | Olmstead et al. | 165/54 |
| 5,056,590 | 10/1991 | Bohn | 165/78 |
| 5,072,719 | 12/1991 | Burger et al. | 126/515 |
| 5,193,610 | 3/1993 | Morissette et al. | 165/54 |
| 5,490,557 | 2/1996 | Taylor | 165/54 |
| 5,497,823 | 3/1996 | Davis | 165/54 |

FOREIGN PATENT DOCUMENTS

| | | | |
|---|---|---|---|
| 69785 | 12/1991 | Canada . | |
| 2059195 | 1/1992 | Canada . | |
| 340109 | 2/1919 | Germany . | |
| 2400734 | 7/1975 | Germany | 165/54 |
| 3006318 | 8/1981 | Germany | 165/54 |
| 0179746 | 10/1983 | Japan | 165/54 |
| 885732 | 11/1981 | U.S.S.R. . | |

OTHER PUBLICATIONS

Advertising materials from Ventex Sweden AB (No date).

*Primary Examiner*—John K. Ford
*Attorney, Agent, or Firm*—D. Peter Hochberg; Mark Kusner

[57] ABSTRACT

A heat recovery ventilator for use in ventilating a building, the ventilator having a single two-position damper operable such that in one damper position, heat is exchanged between a first flow of fresh air passing through the first path and a second flow of exhaust air passing through the second air path. When placed in the second damper position, fresh air is blocked from entering the ventilator and exhaust air is recirculated, passing through both air paths, and exiting through the fresh air outlet. In this mode of operation, exhaust air is inhibited from exiting through the exhaust outlet due to the relative pressures within the ventilator, thereby inhibiting the formation of a negative pressure within the building.

13 Claims, 7 Drawing Sheets

HEAT RECOVERY VENTILATOR WITH ROOM AIR DEFROSTING FEATURE

FIELD OF THE INVENTION

The present invention relates to a heat recovery ventilator (HRV) which is used to transfer heat from warm stale air exiting a building to cool fresh air entering the building. More particularly, the present invention comprises an HRV which employs a single two position damper and balanced internal pressure to defrost the ventilator in cold weather without creating a negative pressure in the building.

BACKGROUND OF THE INVENTION

Heat recovery ventilators or HRVs are known. In recent years, building construction practice standards have become increasingly more rigid in light of a greater public awareness of environmental concerns and a desire for improved energy efficiency. Particularly in colder climates, energy efficient buildings are in demand in light of escalating energy costs and a desire for responsible use of energy resources. In Canada, this demand has led to the development a benchmark building practice and standard known as R2000. R2000 defines a set of guidelines and practices that a builder follows to ensure that the resulting structure is well insulated, energy efficient and, substantially air tight, i.e.—designed to minimize air infiltration/exfiltration through windows, doors and cracks.

One concern with energy efficient buildings such as the R2000 structure is that since the buildings are designed to substantially eliminate air infiltration/exfiltration, factors such as cooking and body odours, germs and depletion of oxygen through normal breathing result is poor indoor air quality. Occupants subjected to poor quality air conditions often complain of frequent illness or excessive fatigue. Further, modern day construction practices employ a wide range of materials and chemicals which tend to contradict these environmentally responsible/energy efficient intentions. A multitude of modern day materials are employed regularly that have been found to be potentially toxic if allowed to accumulate in the air within a building, for example: dry wall joint compound used in finishing walls; synthetic fibres in new carpeting can slowly emit gases into a occupied space; construction adhesives; and paint chemicals are capable of off gassing years after they are installed. Also, in many locations a risk exists that Radon gas will seep into the basement or other substructures of a building.

In order to ensure adequate removal of the above-mentioned conditions/substances which detract from air quality, HRVs were developed to simultaneously exhaust stale air from building spaces and replace it with fresh air at a controlled rate without a substantial loss of heat energy. Conventional HRVs typically comprise: a housing; at least one air to air heat exchanger core; a blower; a stale air passage; a fresh air passage; and appropriate stale and fresh air inlets and outlets. When the building is being heated, by a furnace for example, the heat exchanger core is used to transfer waste heat from the exhausted warm stale air to the incoming cooler fresh air, without the fresh and stale airflows mixing. When the building is being cooled, by an air conditioner for example, heat energy is transferred from the incoming warmer fresh air to the exhausted cooler stale air. In this regard, HRVs provide a means to continually supply a building with fresh air in a relatively energy efficient manner.

When an HRV is used during the heating of a building in a cold climate, the stale air processed by the HRV usually contains a certain amount of moisture. One common problem encountered in these conditions is that the moist stale air can condense and/or freeze as heat is transferred from it within the HRV. This undesirable situation results in a decrease in the heat transfer efficiency of the HRV and, in extreme cases, can result in blockage of the exhaust path and/or damage to the HRV.

Previous attempts have been made to overcome the above-identified problem of condensation and/or freezing (hereinafter referred to as 'frosting'). One prior art solution was to install a thermostatically controlled electric reheat coil in exhaust air path. Several disadvantages result when employing this type of solution. In particular, electrical heating coils are costly to operate and decrease the overall energy efficiency of the HRV.

Another method of defrosting an HRV is to circulate the warm stale air through the frosted passage in the heat exchange core prior to exhausting it. This method is typically accomplished with dampers which block the supply of incoming fresh air and cause the warm stale air to pass through both passages of the heat exchanger to defrost the HRV. In this mode of operation, no fresh air is available to replace the exhausted stale air, leading to the creation of a negative pressure in the building relative to the exterior atmospheric pressure. This negative pressure may cause undesirable infiltration through doors, windows and cracks. An even greater concern is that such a negative pressure can create a backdraft in the flue ducting of gas or oil fired heating equipment which can lead to combustion gases entering the building. Further to this end, the presently proposed 1995 amendments to the Canadian National Building Code, developed by National Research Council of Canada, specifically prohibit whole house depressurization.

U.S. Pat. No. 5,193,610 to Morissette et at. teaches a prior art method of defrosting an HRV which avoids formation of the above-described negative pressure situation. In this reference, two dampers are employed with the first damper being used to redirect warm stale air to both the fresh air inlet and the exhaust air inlet of the heat exchanger. The second damper simultaneously blocks the stale air outlet and redirects the stale air leaving the heat exchanger to the fresh air outlet to prevent any stale air exiting the building through the HRV. In this mode of operation, the HRV recirculates stale air to defrost the heat exchanger.

One problem with this type of arrangement is that the damper assemblies are costly to manufacture as each requires a motor, a damper gate, air seals and some type of control means. In some instances, the damper assemblies only include a single motor and a mechanical linkage is employed to operate multiple damper gates, but this is still relatively expensive to manufacture. Also, in either situation, each damper constitutes a moving part and an increase in the number of moving parts increases the likelihood that the HRV will suffer a mechanical failure at some point in its lifetime.

Another problem associated with conventional HRVs is that the blower assembly is usually difficult to access for required maintenance purposes and thus, preventative maintenance of the HRV may not easily be performed by the building occupant. This can lead to failure of the HRV and/or an accumulation of dust, etc. within it.

SUMMARY OF THE INVENTION

It is an object of the present invention to provide a novel heat recovery ventilator which obviates or mitigates at least one of the above-mentioned disadvantages of the prior art.

According to a first aspect of the present invention, there is provided a heat recovery ventilator for transferring heat between a first airflow and a second airflow comprising: a housing; a first air passage defined between a first inlet and a first outlet; a second air passage defined between a second inlet and a second outlet; a heat transfer means to transfer heat between airflows in said first and second air passages; a blower means to induce said first and second airflows; a damper means comprising a gate movable between a first damper position in which said first and second airflows pass through said heat transfer means and said first and second air passages respectively and a second damper position wherein said first inlet is blocked and where substantially all of said second airflow air is redirected from said heat transfer means to said first passage adjacent said blocked first inlet, said redirected second airflow passing through said heat transfer means to defrost said heat transfer means and then exiting said first outlet; and a control means to control said damper means.

BRIEF DESCRIPTION OF THE DRAWINGS

Preferred embodiments of the present invention will now be described, by way of example only, with reference to the attached Figures, in which.

DESCRIPTION OF THE PREFERRED EMBODIMENTS

Figure 1:
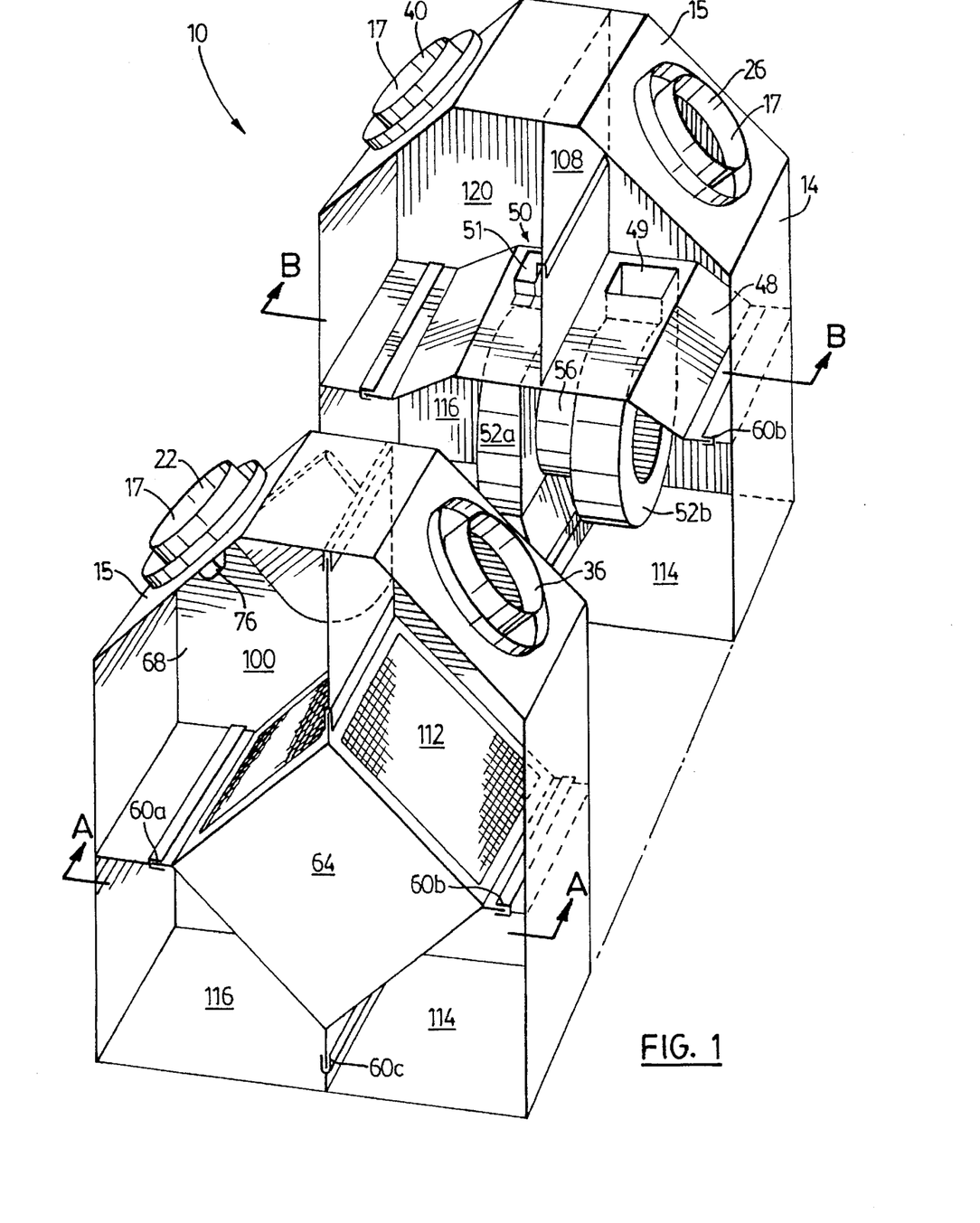
FIG. 1 shows a perspective view of an HRV with a heat exchange portion exploded from a blower portion.

FIG. 1 shows a heat recovery ventilator (HRV) in accordance with a preferred embodiment of the present invention, indicated generally at 10. As can be seen in the Figure, HRV 10 includes a housing 14 having a pair of inclined faces 15 along the top length of the housing. Each face 15 is provided with a pair of connectors 17, each of which surround an aperture into compartments within housing 14, thereby defining a pair of inlets and a pair of outlets. A door 16, best seen in FIG. 4, closes housing 14 and seals HRV 10 to inhibit air infiltration/exfiltration when HRV 10 is in use.

A first airflow path 18 is defined between a first inlet 22 and a first outlet 26. Similarly, a second airflow path 30 is defined between a second inlet 36 and a second outlet 40. First airflow path 18 is identified in FIGS. 5 and 6 with dashed arrows and second airflow path 30 is identified in the same Figures with solid, heavy arrows. Each of these paths will be described in greater detail below. Under normal conditions, the airflow through first airflow path 18 usually comprises fresh air from the exterior of a building and the airflow through second airflow path 30 comprises stale air from the building interior.

Figure 4:
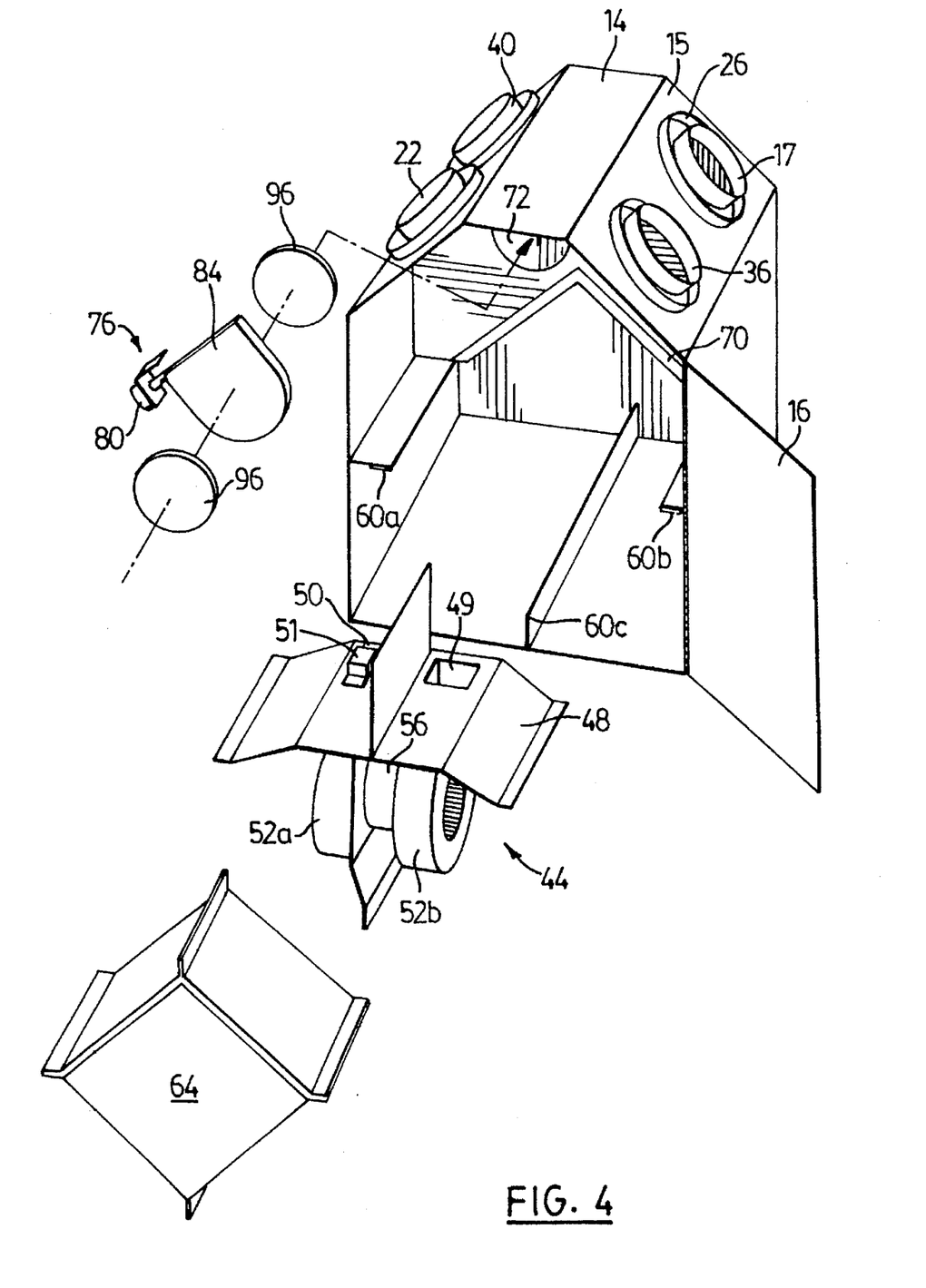
FIG. 4 shows an exploded view of the HRV with the blower assembly, heat exchange core and damper removed.

Blower assembly 44 is provided as a means of inducing an airflow in both first and second airflow paths 18 and 30. As best seen in FIG. 4, blower assembly 44 comprises a mounting frame 48 having intersecting horizontal and vertical plates to which two blower housings 52a, 52b are affixed. A motor 56 is also fixed to mounting frame 48 and drives both blower housing 52a and 52b. If desired, motor 56 may be variable speed to allow HRV 10 to operate at a variety of speeds.

Housing 14 includes four slider tracks 60, one on each side wall (60a, 60b), one on the base (60c) and one (60d) on the central, vertical dividing wall 61 which depends from the top of housing 14. The slider tracks 60 are operable to slidably receive the edges of the horizontal and vertical plates of mounting frame 48, as shown in detail in FIG. 3, such that blower assembly 44 is installed in housing 14 by sliding mounting frame 48 into slider tracks 60 at the front of housing 14. Blower assembly 44 is then slid further into housing 14 on slider tracks 60 until it is in the position shown in FIG. 1. Removal of blower assembly 44, for maintenance or cleaning, is accomplished by reversing the above-mentioned procedure.

HRV 10 employs a known multi-plate air to air heat exchanger core 64, such as those manufactured by Nutech Energy Systems Inc., 511 McCormick Blvd., London, Ontario, Canada. Heat exchanger core 64, which in the preferred embodiment is substantially cubical, includes a set of slider edges such that heat exchanger core 64 can also be slidably inserted in, and removed from, the forward portion of housing 14 once blower assembly 44 has been installed. As with blower assembly 44, the slidable mounting of heat exchanger core 64 allows quick installation and removal for both maintenance and cleaning purposes.

As shown the Figures, heat exchanger core 64 is oriented such that two of its faces, the inlet faces, are substantially parallel to inclined faces 15. This feature assists in reducing the pressure losses within the HRV by reducing the number of bends the airflows would otherwise have to traverse.

Figures 2, 3:
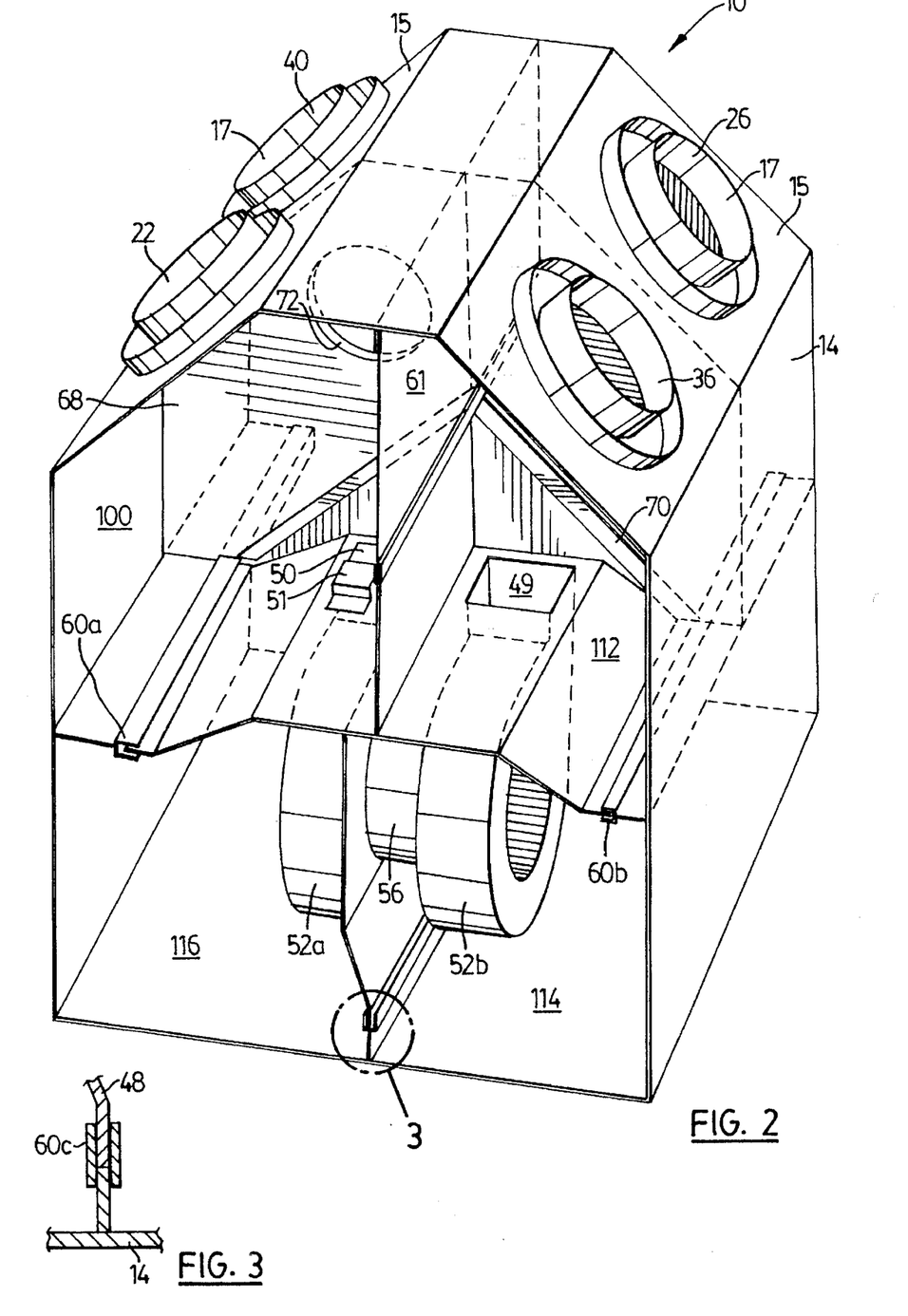
FIG. 2 shows a perspective view of the HRV of FIG. 1 wherein a blower assembly is being installed.
FIG. 3 shows a detail of the track which receives the blower assembly of FIG. 2 in the HRV.

As best seen in FIG. 2, housing 14 also includes a lateral divider wall 68 which depends from the top of housing 14 to slider tracks 60a and 60b. Divider wall 68 also includes a triangular aperture through which blower assembly 44 passes as it is slid into the rear of housing 44 and against which heat exchanger core 64 abuts in a seating manner when heat exchanger core 64 is inserted into housing 14.

As best shown in FIG. 1, when blower assembly 44 and heat exchanger core 64 are in place, they cooperate with central divider wall 61 and lateral divider wall 68 to form six substantially isolated compartments within housing 14. The six compartments are arranged in two separate series of three compartments each, and each series forms one of first airflow path 18 and second airflow path 30.

Specifically, first inlet 22 communicates with compartment 100 which communicates in turn with a first inlet of heat exchanger core 64. The corresponding first outlet of heat exchanger core 64 communicates with compartment 114 which, because divider wall 68 terminates at the horizontal arms of blower mounting 48, extends along the full length of housing 14 to the inlet of blower housing 52b. The outlet port 49 of blower housing 52b is in compartment 108 which communicates with first outlet 26. This combination of compartments 100, 114 and 108, along with heat exchanger core 64 and blower housing 52b, forms first airflow path 18.

Similarly, second inlet 36 communicates with compartment 112 which communicates in turn with a second inlet of heat exchanger core 64. The corresponding second outlet of heat exchanger core 64 communicates with compartment 116 which, similar to compartment 114, extends the full length of housing 14 to the inlet of blower housing 52a. The outlet port 50 of blower housing 52a is in compartment 120 which communicates with second outlet 40. This combination of compartments 112, 116 and 120, along with heat exchanger core 64 and blower housing 52a, forms second airflow path 30.

Figure 5:
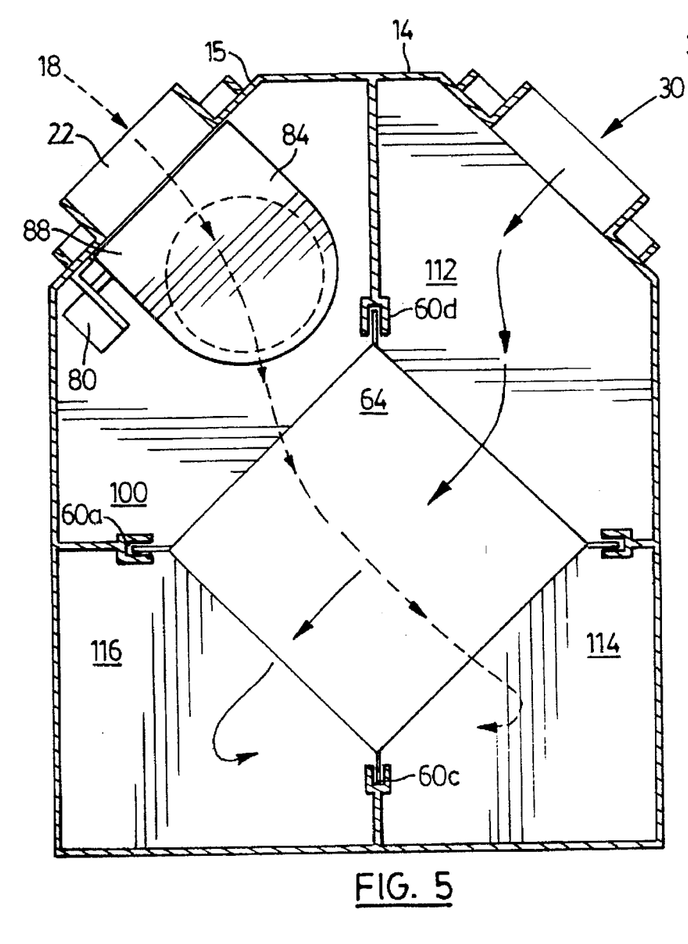
FIG. 5 shows a section taken along line A—A of FIG. 1 of the heat exchange core portion of the HRV showing the airflows in a ventilation mode.

As shown in FIGS. 4 and 5, a port 72 is provided in divider wall 68 between compartment 100 and compartment 120. A damper means, indicated generally at 76, is installed within compartment 100 and is operable to either close port 72 or close first inlet 22. Specifically, damper means 76 comprises a drive means 80, which is attached to the interior of inclined face 15, and whose drive shaft is connected to a gate 84 such that gate 84 is movable between a ventilation position, wherein port 72 is closed and a defrost position wherein first inlet 22 is closed. In the presently preferred embodiment, drive means 80 is a reversible electric motor, gate 84 is formed from a piece of gauge sheet metal to each side of which a foam sealing member 96 has been attached. Drive means 80 is connected to a control means (not shown), the operation of which will be described in greater detail below.

Figure 6:
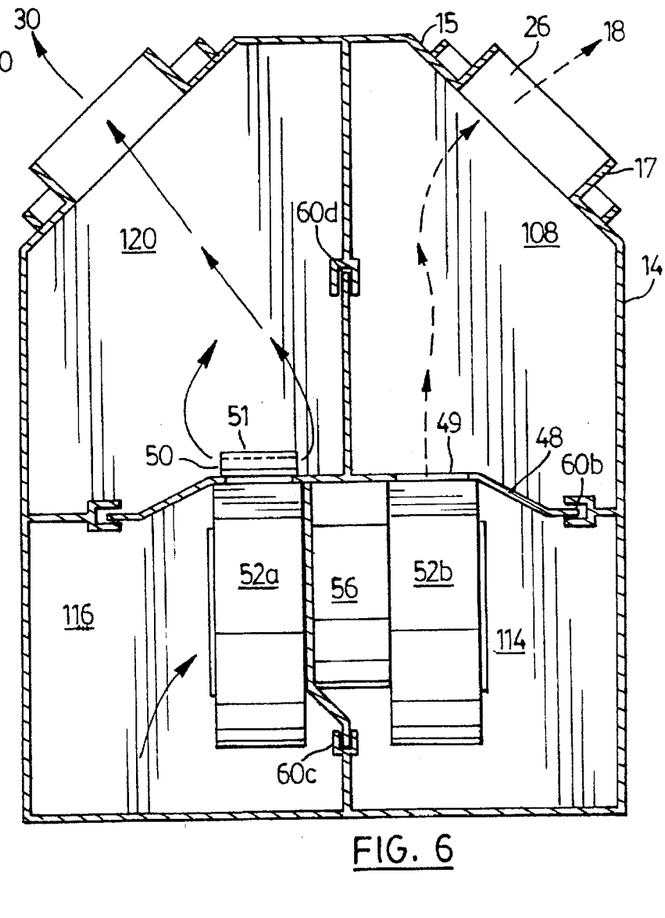
FIG. 6 shows a section taken along line B—B of FIG. 1 through the blower portion of the HRV showing the airflows in the ventilation mode.

The present invention has two operating modes, namely a ventilation mode and a defrost (or recirculation) mode. During use, HRV 10 operates predominantly in ventilation mode. FIGS. 5 and 6 show HRV 10 in ventilation mode under normal conditions, as if HRV 10 were installed in a residential or commercial structure. In situations where the temperature of the fresh air from outside the building is cooler than the stale air from within the building, heat is transferred in heat exchanger core 64 from the stale air exiting the building through HRV 10 to the fresh air entering the building through HRV 10.

Under these conditions, first airflow path 18 carries the fresh air into the building and second airflow path 30 carries the stale air intended for discharge from the building. During ventilation mode, gate 84 remains in the ventilation position such that port 72 is closed and first inlet 22 is open. As indicated by the dashed arrows in the Figures, blower assembly 44 draws the cool fresh air through first inlet 22, compartment 100 into heat exchanger core 64. Simultaneously, blower assembly 44 also draws warm exhaust air, as indicated by the heavy arrows in the Figures, through second inlet 36, compartment 112 and into heat exchanger core 64.

Heat from the stale air is transferred to the fresh air in heat exchanger core 64 resulting in the fresh and stale airflows leaving the heat exchanger as warmed fresh air and cooled stale air respectively. During passage through heat exchanger core 64, the moisture in the stale air condenses within heat exchanger core 64 and drops to the bottom of housing 14. A drain (not shown) is provided through housing 14 to allow this condensate to escape.

From heat exchanger core 64, the fresh air is drawn through compartment 114 into blower housing 52b. Similarly, from heat exchanger core 64 the stale air is drawn through compartment 116 into blower housing 52a. It is important to note that the aforementioned passages and compartments, up to blower assembly 44, are maintained at a relative negative pressure by the draw of blower housings 52a and 52b.

The warmed fresh air is forced, by blower 52b out of port 49, into compartment 108 and out through first outlet 26 where duct work (not shown) carries the air into the building supply distribution duct work. Similarly, the cooled stale air is forced by blower 52a out of port 50, into compartment 120 and out through second outlet 40 where duct work carries this air to the exterior of the building.

Under conditions in which the outside air is below freezing the above-described problem of frosting can occur. As is often the case in cold climates, the heat energy transferred from the stale air to the fresh air is enough to cause the stale air to drop below 32° F. (0° C.). If there is sufficient moisture in the stale air, the moisture will condense and can freeze in a portion of heat exchanger core 64 closest to compartment 116. Upon continued operation of HRV 10, ice can build up to the point a serious degradation of heat transfer efficiency occurs and/or the flow of fresh air through HRV 10 is reduced or inhibited.

Figure 7:
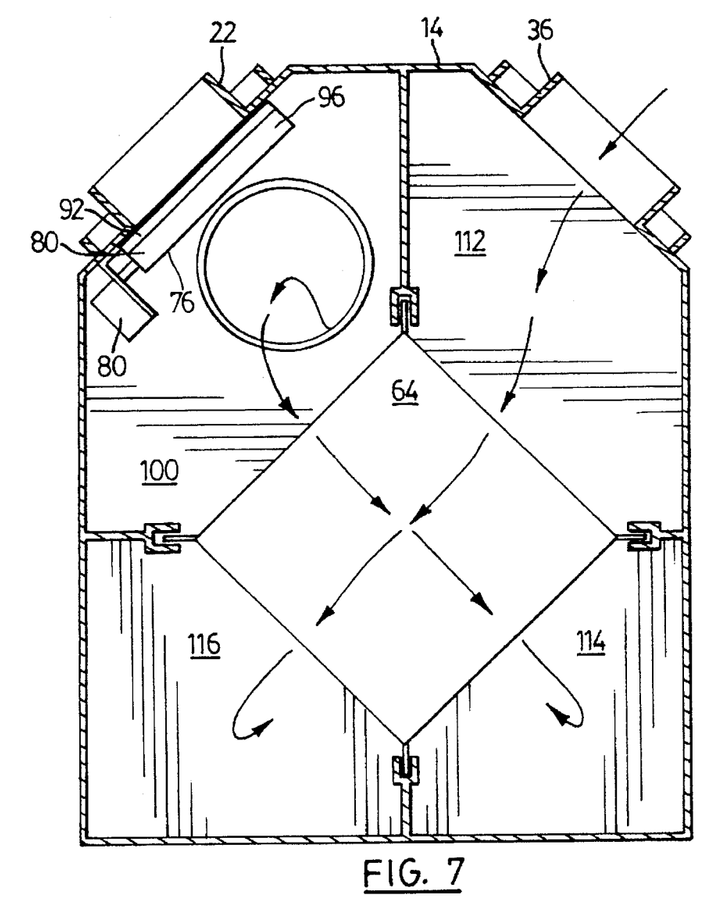
FIG. 7 shows a section taken along a line A—A of FIG. 1 showing the airflows in a defrost mode.
Figure 8:
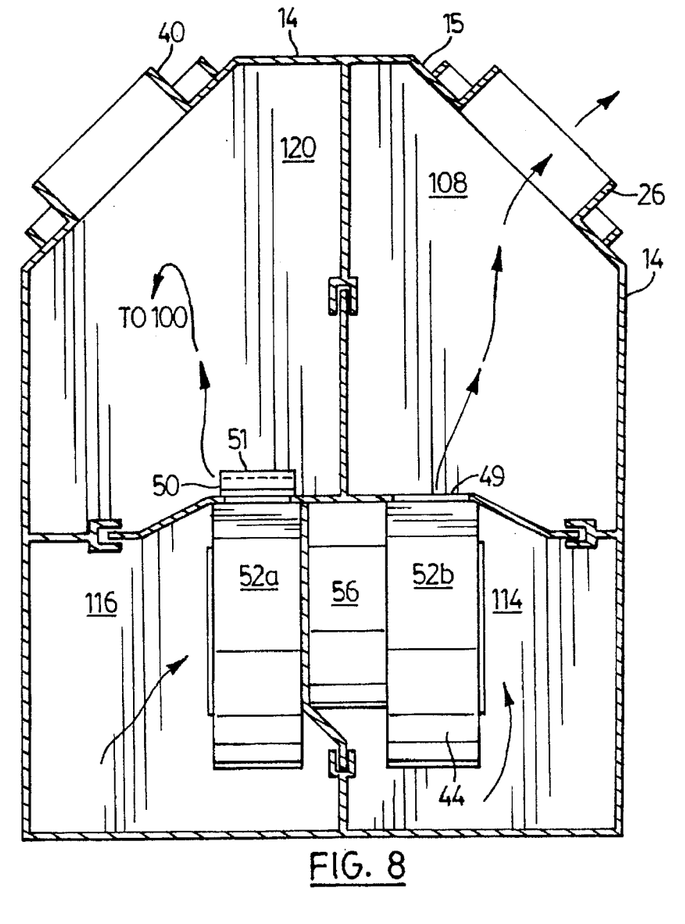
FIG. 8 shows a section taken along line B—B of FIG. 1 showing the airflows in the defrost mode.

Accordingly, HRV 10 includes a defrost mode which substantially eliminates the above-described problems. FIGS. 7 and 8 show the airflows in the defrost mode of operation. During defrost mode, gate 84 is in the defrost position, closing first inlet 22 and preventing fresh air from entering first airflow path 18.

Thus, as shown in FIG. 7 and 8, warm stale air is drawn (by negative pressure induced by blower housing 52a) into second inlet 36, through compartment 112, into the second passage of heat exchanger core 64, through compartment 116 into blower housing 52a. The warm stale air exits blower housing 52a, under pressure, through port 50 into compartment 120. Because gate 84 has opened port 72 and closed first inlet 22, a negative pressure is created by blower 52b in compartment 100. This causes the warm stale air in compartment 120 to be drawn through port 72, compartment 100, the first inlet of heat exchanger core 64, compartment 114 and into blower housing 52b. The warm stale air exits blower housing 52b through port 49 into compartment 108 and then exits through first outlet 26 back into the building. When passing through the first inlet in heat exchanger core 64, this warm stale air serves to defrost the first inlet and any resulting liquid moisture exits housing 14 through the above-mentioned drain or may be evaporated by the stale air, serving to humidify it.

To ensure that substantially no warm stale air exits second outlet 40, the relative pressure in compartment 120 is balanced by the blower housings 52a, 52b to ensure that substantially all of the air exiting port 50 enters port 72. If required, additional balancing may be achieved by providing one or more baffles, as desired. For example, in the presently preferred embodiment it has been determined that improved balancing is obtained with a baffle plate 51 in place, baffle plate 51 ensuring that the airflow exiting port 50 is not aimed directly at second outlet 40.

As will be apparent to those of skill in the art, any other suitable balancing mechanism or combination of mechanisms may be employed provided that the pressure on the compartment 100 side of port 72 is sufficiently less than the pressure on the compartment 120 side of port 72 to ensure that the warm stale air does not exit second outlet 40 to any substantial degree. Consequently, this method prevents a negative pressure situation occurring within the building and operates with a single two-position damper means.

In the presently preferred embodiment, the control means for HRV 10 comprises a temperature sensor (not shown) which is located in close proximity to first inlet 22 such that when the temperature of the cool fresh air drops to a temperature of approximately 26.6° F. (–3° C.) or below, HRV 10 will enable operation in defrost mode. The temperature sensor in the presently preferred embodiment comprises a thermistor which is connected to the control means. When the defrost mode is enabled, the control means operates to provide a "3 and 30" cycle. Specifically, in this cycle HRV 10 operates in ventilation mode for approximately 30 minutes, as previously described, and then switches to defrost mode for approximately 3 minutes. It is further contemplated that other defrost cycles can also be employed as desired.

For example, in an alternative embodiment, the control means is operable to select from two or more different cycles, depending upon the temperature of the cool fresh air. For example, if the cool fresh air has a temperature below –20° C., as indicated by the thermistor, the control means may operate HRV 10 in a "6 and 30" cycle (or a "3 and 15" cycle) with operation reverting to the "3 and 30" cycle when the cool fresh air warms to a temperature above –20° C.

During warmer seasons when the fresh air is warmer than the stale air, such as for example when the building is air conditioned, the effect of HRV 10 will be to cool the fresh air. Of course, under these conditions defrost mode will be inhibited by the control means and HRV 10 will continually operate in ventilation mode.

Figure 9:
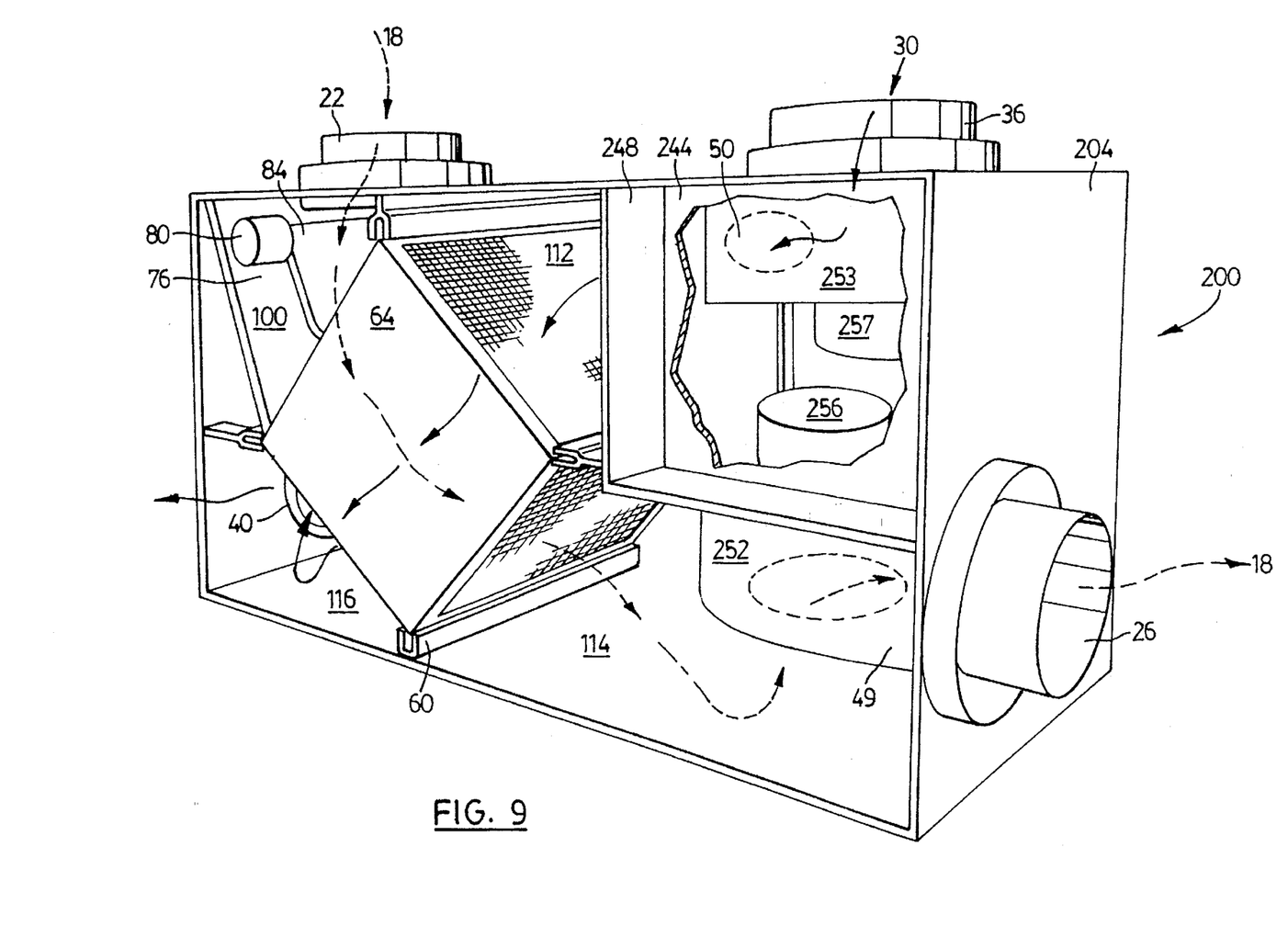
FIG. 9 shows a perspective and partially cut-away view of an HRV in accordance with another embodiment of the present invention when operating in a ventilation mode.
Figure 10:
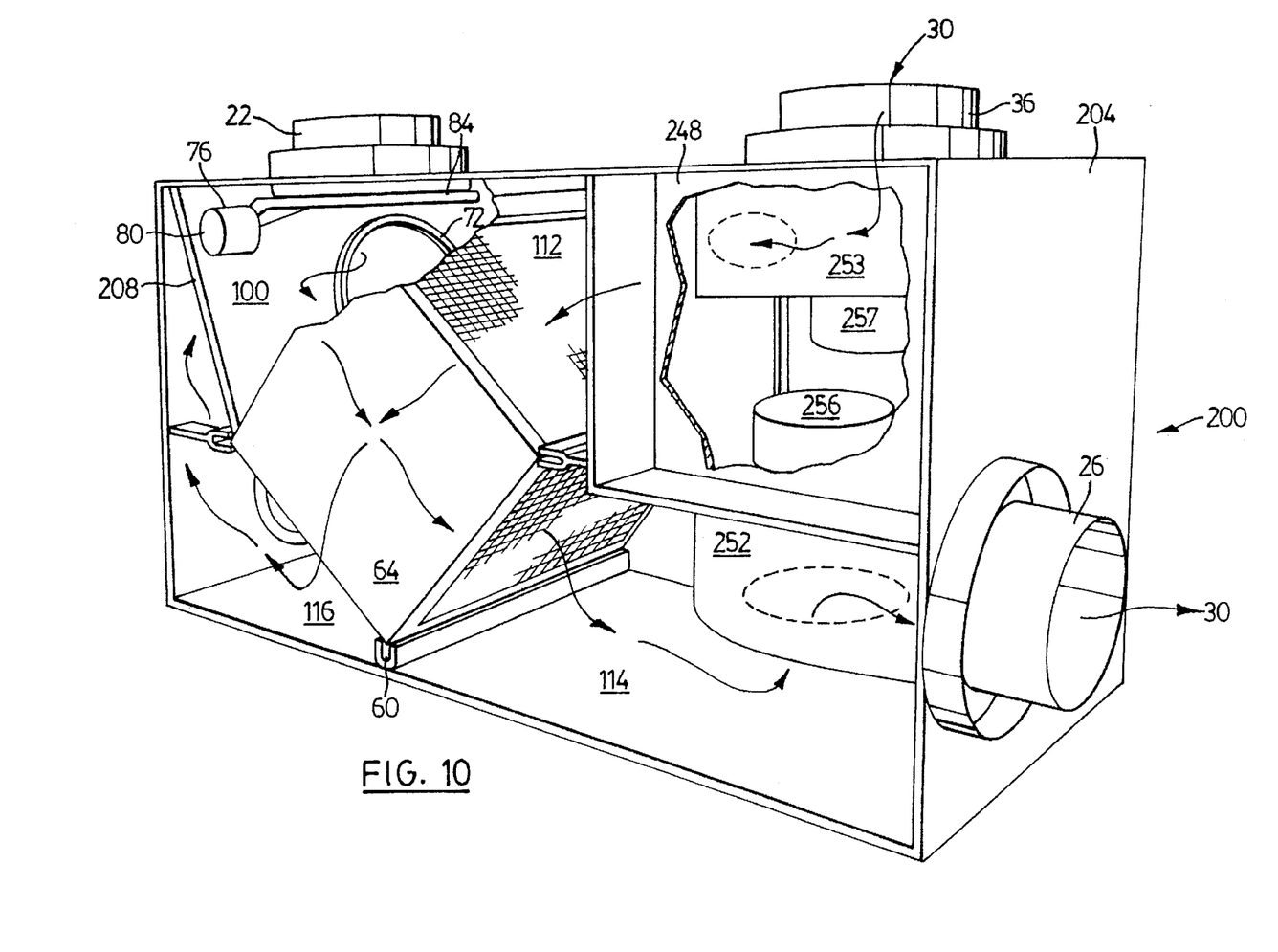
FIG. 10 shows a perspective and partially cut-away view of the HRV of FIG. 9 during operation in a defrost mode.

An alternative embodiment in accordance with the present invention is shown in FIGS. 9 and 10 and, in these Figures, like elements to those of the above-described embodiment of FIGS. 1 through 8, are indicated with like reference numerals.

An HRV 200 is provided with a generally rectangular housing 204. In the case of this embodiment, first and second outlets 26, 40 are located on opposing vertical sides of housing 200 as it is contemplated that this configuration may be desired for some installations.

A blower assembly 244 is fixed in the top right corner of housing 204. Blower assembly 244 comprises a mounting frame 248 to which a pair of blower housings 252 and 253 are mounted, each of which is connected to a respective one of a pair of motors 256 and 257. As shown in the Figures, and unlike the embodiment of FIGS. 1 through 8, blower assembly 244 is not slidably mounted within housing 204 as adequate access is provided to blower assembly 244 when the door (not shown) for housing 204 is opened. However, it is contemplated that a slidably removable assembly similar to that described with respect to FIGS. 1 through 8, can be employed if desired. It is also contemplated that blower assembly 244 can employ a single motor, if desired.

In this embodiment, housing 204 is essentially divided into four compartments. Specifically, first inlet port 22 communicates with compartment 100 which communicates in turn with a first inlet of heat exchanger core 64. The corresponding first outlet of heat exchanger core 64 communicates with compartment 114 and then with blower housing 252 and first outlet 26.

In a similar manner, second inlet port 36 communicates with blower housing 253, compartment 112, and then with a second inlet of heat exchanger core 64. The corresponding second outlet of heat exchanger core 64 communicates with compartment 116 and then with second outlet 40. Port 72 is located on a divider wall 208 which separates compartment 100 from compartment 116. Damper means 76, is fixed to divider wall 208 within compartment 100 and is operable to either close port 72 or close first inlet 22.

The operation of HRV 200 is substantially the same as the previously described operation with respect to HRV 10. One difference of HRV 200 is that outlet port 49 of blower housing 252 vents directly to first outlet 26, and the suction side of blower housing 253, associated with second airflow path 30, is located directly adjacent second inlet 36. Consequently, air in the first airflow path 18 is drawn through a majority of HRV 200 by negative pressure until it enters blower housing 252, adjacent the first outlet 26. Similarly, air in the second airflow path 30 is blown through HRV 200 under positive pressure.

While operating in ventilation mode, as shown in FIG. 9, gate 84 is in the ventilation position, closing port 72. Cool fresh air is drawn through first inlet 22, compartment 100 and into heat exchanger core 64. Simultaneously, warm stale air is drawn into second inlet 36 and into blower housing 253 from which it is blown under pressure through compartment 112 into heat exchanger core 64. Heat from the warm stale air is transferred to the cool fresh air in the heat exchanger core 64. Exiting heat exchanger core 64, the warmed fresh air enters compartment 114 where it is drawn into blower housing 252 and blown out under pressure via port 49 and first outlet 26. Similarly, the cooled stale air exits heat exchanger core 64 into compartment 116 and is blown out through second outlet 40.

When operating in defrost mode, as shown in FIG. 10, gate 84 is moved to the defrost position, closing first inlet 22 and allowing air to move through port 72 from compartment 100 to compartment 116. During operation in defrost mode, warm stale air entering second inlet 36 is blown through blower housing 253 and into compartment 112. The air then passes through heat exchanger core 64 under pressure into compartment 116. At this point, the positive pressure from blower 253 is substantially balanced by the negative pressure in compartment 100 formed by blower 252. Thus, stale air passes through port 72, into compartment 100 where it is routed back through heat exchanger core 64, compartment 114, blower housing 252 and out through first outer 26. In this mode of operation, HRV 200 functions to recirculate warm stale exhaust air through HRV 200 for the purposes of defrosting heat exchanger core 64.

As will be apparent to one of skill in the art, the pressure balance created between compartment 116 and compartment 120 results in a pressure at second outlet 40 which is substantially at or below atmospheric conditions and egress of stale air through second outlet 40 is substantially eliminated. As before, the formation of a relative negative pressure within the building is thus inhibited.

The control means for HRV 200 is substantially the same as that described above for the embodiment of FIGS. 1 through 8 and a similar "3 and 30" cycle is typically employed.

It is contemplated that the materials and means described above may be substituted without departing from the spirit and scope of the invention. For example, although the above-described drive means employed an electrical motor, it is contemplated that vacuum motors, solenoids or air cylinders could also be employed. Also, the blower means may be any suitable device including individual blower/motor units. It is also contemplated that the housing, gate and divider walls may be fabricated from any suitable material including sheet metal, plastic and/or fibreglass.

We claim:

1. A heat recovery ventilator for transferring heat between a first airflow and a second airflow comprising:

a housing;

a first airflow path defined between a first inlet and a first outlet;

a second airflow path defined between a second inlet and a second outlet;

a heat transfer means to transfer heat between airflows in said first and second airflow paths;

a blower means to induce said first and second airflows;

a damper means comprising a substantially flat gate movable between a first damper position in which said first and second airflow paths are substantially isolated from one another within said housing and said first and second airflows pass through said heat transfer means and said first and second air paths respectively, and a second damper position wherein said first inlet is blocked and where substantially all of said second airflow air is redirected from said heat transfer means to said first airflow path adjacent said blocked first inlet, said redirected second airflow passing through said heat transfer means to defrost said heat transfer means and then exiting said first outlet; and a control means to control said damper means.

2. A heat recovery ventilator according to claim 1 wherein said control means prevents movement of said gate between said first and second damper positions until said first airflow reaches a predefined temperature at said first inlet.

3. A heat recovery ventilator according to claim 2 wherein said gate is moved between said first and second damper positions in a predefined cyclical manner.

4. A heat recovery ventilator according to claim 3 wherein said predefined temperature is less than approximately at 26° F. (−3° C.).

5. A heat recovery ventilator according to claim 3 wherein said predetermined time cycle comprises approximately 3 minutes in said second position after 30 minutes in said first position.

6. A heat recovery ventilator according to claim 1 wherein said first and second inlets and said first and second outlets are provided on the top of said housing.

7. A heat recovery ventilator according to claim 1 wherein said first and second outlets are provided on opposed sides of said housing.

8. A heat recovery ventilator according to claim 1 wherein said blower means to induce comprises a centrifugal type blower.

9. A heat recovery ventilator according to claim 1 wherein said heat transfer means is slidably mounted within said housing.

10. A heat recovery ventilator according to claim 9 wherein said blower means is slidably mounted within said housing.

11. A heat recovery ventilator according to claim 10 wherein said heat transfer means and said blower means are slidably mounted on a common set of mounts.

12. A heat recovery ventilator according to claim 1 wherein said heat transfer means comprises a substantially cubical, multi-plate air to air heat exchanger.

13. A heat recovery ventilator according to claim 1 wherein airflow through the portion of said first airflow path between said first inlet and said heat transfer means and the portion of said second airflow path from said second inlet to said heat transfer means is substantially linear.

* * * * *